E. L. WOODARD.
TILLING IMPLEMENT.
APPLICATION FILED MAR. 26, 1917.
1,241,596.
Patented Oct. 2, 1917.
2 SHEETS—SHEET 1.
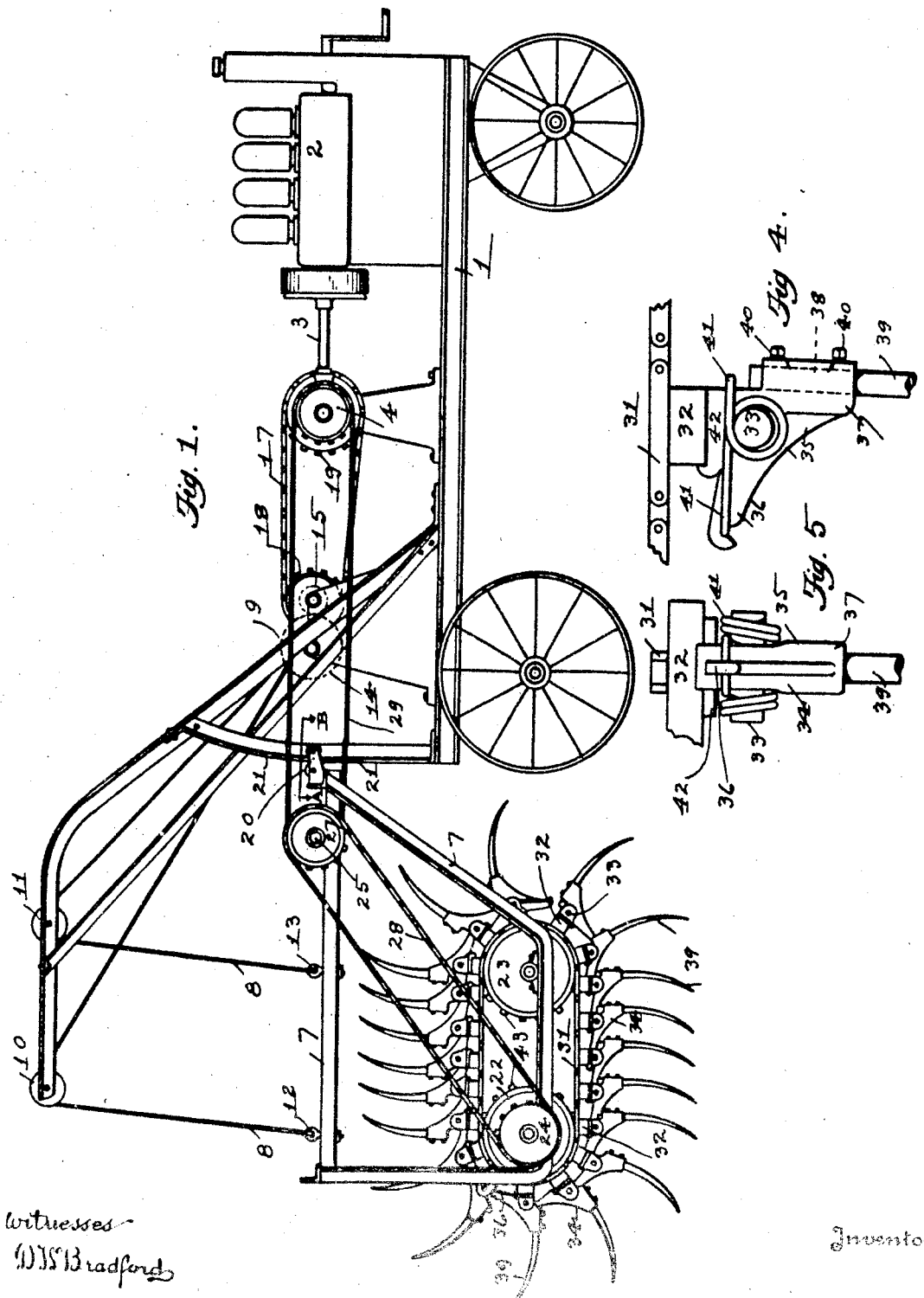

E. L. WOODARD.
TILLING IMPLEMENT.
APPLICATION FILED MAR. 26, 1917.
1,241,596.
Patented Oct. 2, 1917.
2 SHEETS—SHEET 2.
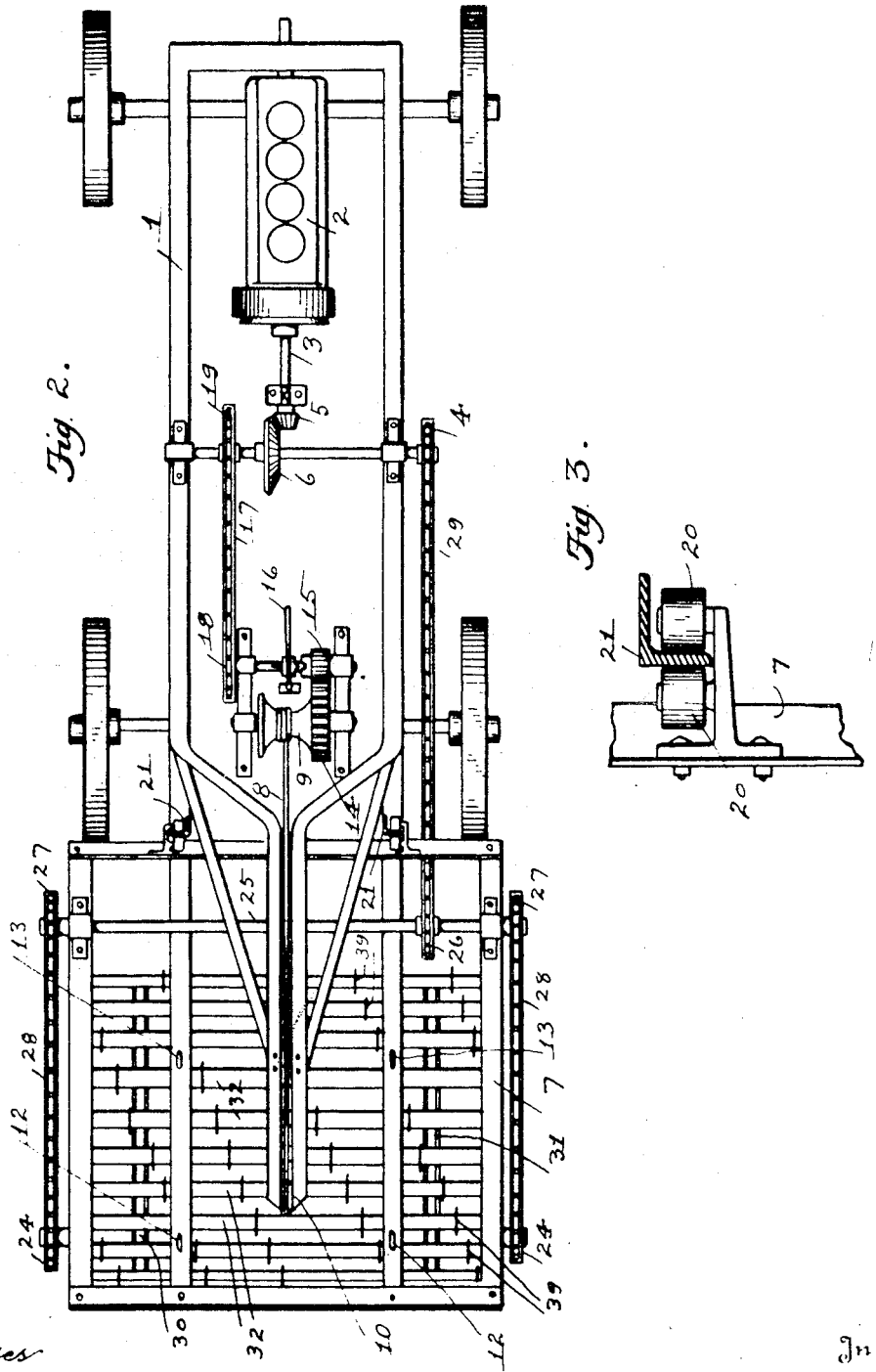
Witnesses
W. W. Bradford
Inventor
Ernest L. Woodard
By
Cyrus W. Rice
his Attorney

UNITED STATES PATENT OFFICE.

ERNEST L. WOODARD, OF EUREKA TOWNSHIP, MONTCALM COUNTY, MICHIGAN.

TILLING IMPLEMENT.

1,241,596.     Specification of Letters Patent.     Patented Oct. 2, 1917.

Application filed March 26, 1917. Serial No. 157,293.

*To all whom it may concern:*

Be it known that I, ERNEST L. WOODARD, a citizen of the United States, residing at Eureka township, in the county of Montcalm and State of Michigan, have invented new and useful Improvements in Tilling Implements, of which the following is a specification.

The present invention relates to tilling implements, and its object is to provide such an implement in which the tilling means are carried by a belt on spaced rotatable members mounted on a carriage adapted to be raised and lowered to different parallel positions; and further, to provide yieldingly mounted tilling means for such an implement; and further, to provide detachable earth-engaging parts of such means. These and any other objects appearing hereinafter are attained by, and the invention finds preferable embodiment in, the structure hereinafter described and illustrated by the accompanying drawings, in which:—

Figure 1 is a side view of a tilling implement;

Fig. 2 is a plan view of the same;

Fig. 3 is a cross section (enlarged) of a part thereof taken on a plane corresponding to line A—B of Fig. 1;

Fig. 4 is a side view of a portion of one of the tilling means and its carrying belt; and Fig. 5 is a front view of the same.

In the embodiment of the invention chosen for illustration by the drawings and for detailed description in the body of this specification, the wheeled vehicle 1 carries the driving power for the tilling mechanism, as the gasolene engine 2, whose shaft 3 rotates the driving sprocket wheel 4 through bevel gears 5, 6. A carriage 7 is carried by the vehicle and is adapted to be raised and lowered relatively thereto to different positions in parallelly disposed horizontal planes; this is effected in the construction shown by supporting the carriage on suitable flexible elements, as the cords 8, which are wound on a drum 9 mounted on the vehicle, and pass over sheaves 10, 11 spaced in the vehicle's longitudinal direction, and are attached to the carriage at points 12, 13 spaced correspondingly to the spacing of the sheaves. By rotating the drum as from the engine by throwing into operation the gears 14, 15 by a suitable clutch indicated at 16, (the power being transmitted by the chain 17 carried by the sprocket wheels 18, 19) the carriage may be raised or lowered in the manner described. In such movement the carriage is guided by its rolls 20 which engage the opposite sides of guides 21 mounted on the vehicle and arcuate in the vehicle's vertical longitudinal plane as shown.

The carriage carries rotatable members 22, 23, one of which 22 is provided with a sprocket wheel 24. The carriage has also a shaft 25 on which are keyed the sprocket wheels 26, 27 on one of which 27 and the rotatable member's wheel 24 a chain 28 is carried. In the construction illustrated wheels 24 and 27 carrying chains 28 are shown at both sides of the carriage (Fig. 2). On the other sprocket wheel 26 and the driving sprocket wheel 4 on the vehicle is carried a chain 29, so that the rotatable member 22 is driven through such chains and sprocket wheels by the driving wheel 4. The driving sprocket wheel 4 is concentric with the arcuate guide 21 so that the chain 29 remains at the same tension in any position of the carriage. The rotatable members 22, 23 carry a belt composed of a pair of sprocket chains 30, 31 connected by cross bars 32, and engaging sprocket teeth 43 on said members. On these cross bars are pivotally mounted on spindles 33 the tilling means 34. These means comprise a body portion 35 having a forwardly-extending arm 36 and a downwardly-extending portion 37 provided with a socket 38 (shown in dotted lines in Fig. 4) and adapted to removably hold an earth-engaging member as the tooth 39, which is held in the socket by set screws 40. A spring 41 is coiled around the spindle 33 of the tilling means, its bight portion continuing around under the arm 36 and its free ends pressing against a member 42 fixed on the belt. This spring is adapted to press the tilling means forwardly on its pivotal mounting, but to yield when any unusual obstruction is encountered in tilling the earth.

In using the word "forwardly" in connection with the tilling means reference is made to the direction of such means' operative movement.

It will be seen that the sheaves 10, 11 being of the same diameter, and their axes spaced apart the same distance as the points 12, 13 are spaced, the carriage when raised or lowered will always occupy parallel planes.

The invention being intended to be defined solely by the claims is not to be limited to or by details of construction shown or described.

I claim:

1. In an implement of the character described; a vehicle; a carriage carried thereby and adapted to be raised and lowered relatively thereto to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; means for rotating said members; the axes of said rotatable members being so positioned as to carry the lower portion of the belt which is between said members parallelly with the ground.

2. In an implement of the character described; a vehicle; a carriage carried thereby and adapted to be raised and lowered relatively thereto to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; means carried by the vehicle for rotating said members; the axes of said rotatable members being so positioned as to carry the lower portion of the belt which is between said members parallelly with the ground.

3. In an implement of the character described; a vehicle; a carriage carried thereby and adapted to be raised and lowered relatively thereto, in an arcuate movement, to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; a rotatable driving element carried by the vehicle and concentric with the arcuate movement of the carriage and adapted to rotate said driving member.

4. In an implement of the character described; a vehicle having a guide arcuate in the vehicle's vertical, longitudinal plane; a carriage carried by the vehicle and adapted to be raised and lowered relatively thereto, guided by the guide, to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; a rotatable driving element carried by the vehicle and concentric with the guide and adapted to rotate said driving member.

5. In an implement of the character described; a vehicle having a guide arcuate in the vehicle's vertical longitudinal plane; a carriage carried by the vehicle and adapted to be raised and lowered relatively thereto, guided by the guide, to different positions wherein the planes in which lie the axes of both the spaced rotatable members hereinafter mentioned are parallelly disposed; concentric sprocket wheels keyed together and mounted on the carriage; spaced rotatable members mounted on the carriage and whose axes are transverse to the vehicle's traveling movement, one of them having a sprocket wheel; a sprocket chain carried on one of the first mentioned sprocket wheels and on said member's sprocket wheel; a belt carried on said members and having tilling means; a driving sprocket wheel mounted on the vehicle and concentric with the guide; a sprocket chain carried by said driving wheel and by the other of the first-mentioned sprocket wheels.

6. In an implement of the character described; a vehicle; a carriage carried thereby and adapted to be raised and lowered relatively thereto to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; means for rotating said members; means carried by the vehicle for raising and lowering the carriage; the axes of said rotatable members being so positioned as to carry the lower portion of the belt which is between said members parallelly with the ground.

7. In an implement of the character described; a vehicle; a carriage carried thereby and adapted to be raised and lowered relatively thereto to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; means carried by the vehicle for rotating said members; means carried by the vehicle for raising and lowering the carriage; the axes of said rotatable members being so positioned as to carry the lower portion of the belt which is between said members parallelly with the ground.

8. In an implement of the character described; a vehicle; a carriage carried thereby and adapted to be raised and lowered relatively thereto, in an arcuate movement, to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; a rotatable driving element carried by the vehicle and concentric with the arcuate movement of the carriage and adapted to rotate said driving member; means carried by the vehicle for raising and lowering the carriage.

9. In an implement of the character described; a vehicle having a guide arcuate in the vehicle's vertical longitudinal plane; a carriage carried by the vehicle and adapted to be raised and lowered relatively thereto, guided by the guide, to different positions wherein the planes in which lie the axes of both rotatable members hereinafter mentioned are parallelly disposed; spaced rotatable members mounted on the carriage and whose axes are transverse to the vehicle's traveling movement; a belt carried on said members and driven by one of them and having tilling means; a rotatable driving element carried by the vehicle and concentric with the guide and adapted to rotate said driving member; means carried by the vehicle for raising and lowering the carriage.

10. In an implement of the character described; a vehicle having a rotatable drum and sheaves spaced in the vehicle's longitudinal direction; a carriage carried by the vehicle and adapted to be raised and lowered relatively thereto in an arcuate movement; rotatable tilling means mounted on the carriage and whose axes are transverse to the vehicle's traveling movement; flexible elements wound on the drum and passing over the sheaves and attached to the carriage at points spaced correspondingly to the spacing of the sheaves, for raising and lowering the carriage by the drum.

11. In an implement of the character described; a vehicle having a rotatable drum and sheaves spaced in the vehicle's longitudinal direction; a carriage carried by the vehicle and adapted to be raised and lowered relatively thereto in an arcuate movement; rotatable tilling means mounted on the carriage and whose axes are transverse to the vehicle's traveling movement; flexible elements wound on the drum and passing over the sheaves and attached to the carriage at points spaced correspondingly to the spacing of the sheaves, for raising and lowering the carriage by the drum; means carried by the vehicle for rotating the tilling means.

12. In an implement of the character described; rotatable members; a belt carried on said members and driven by one of them and comprising pivotally-connected links; tilling means pivotally mounted directly on the several links; springs adapted to yieldingly press the tilling means forwardly on their pivotal mountings.

13. In an implement of the character described; rotatable members; a belt carried on said members and driven by one of them and comprising pivotally-connected links; tilling means turnably mounted on spindles on the several links; springs coiled around the spindles on both sides of each tilling means and continuing from one side thereof to the other and adapted to press the tilling means forwardly on their pivotal mountings.

14. In an implement of the character described; rotatable members; a belt carried on said members and driven by one of them and comprising pivotally-connected links; tilling means comprising body portions pivotally mounted on the several links and provided with sockets and set screws, the tilling means also comprising earth-engaging portions removably held in the sockets by the set screws.

In testimony whereof I have hereunto set my hand.

ERNEST L. WOODARD.